E. HANSALPAKAR.
MACHINE FOR MAKING HEEL LOGS.
APPLICATION FILED FEB. 25, 1913.

1,065,803.

Patented June 24, 1913.

5 SHEETS—SHEET 1.

Witnesses:

Inventor:
E. Hansalpakar
by Night Brown Quinby May
Attorneys.

E. HANSALPAKAR.
MACHINE FOR MAKING HEEL LOGS.
APPLICATION FILED FEB. 25, 1913.

1,065,803.

Patented June 24, 1913.
5 SHEETS—SHEET 2.

Witnesses:

Inventor:
E. Hansalpakar
Attorneys.

E. HANSALPAKAR.
MACHINE FOR MAKING HEEL LOGS.
APPLICATION FILED FEB. 25, 1913.
1,065,803.
Patented June 24, 1913.
5 SHEETS—SHEET 3.
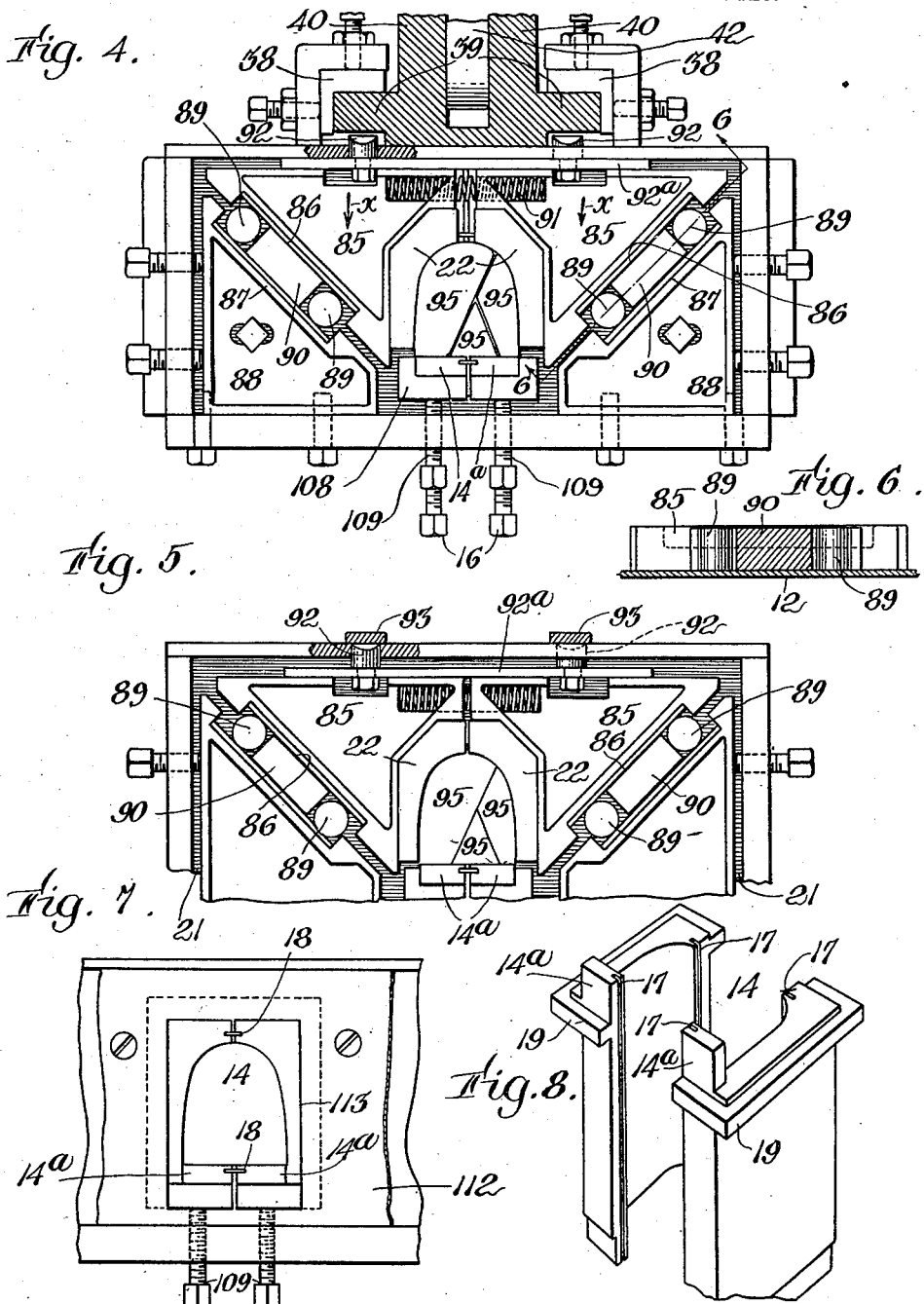

E. HANSALPAKAR.
MACHINE FOR MAKING HEEL LOGS.
APPLICATION FILED FEB. 25, 1913.
1,065,803.
Patented June 24, 1913.
5 SHEETS—SHEET 4.
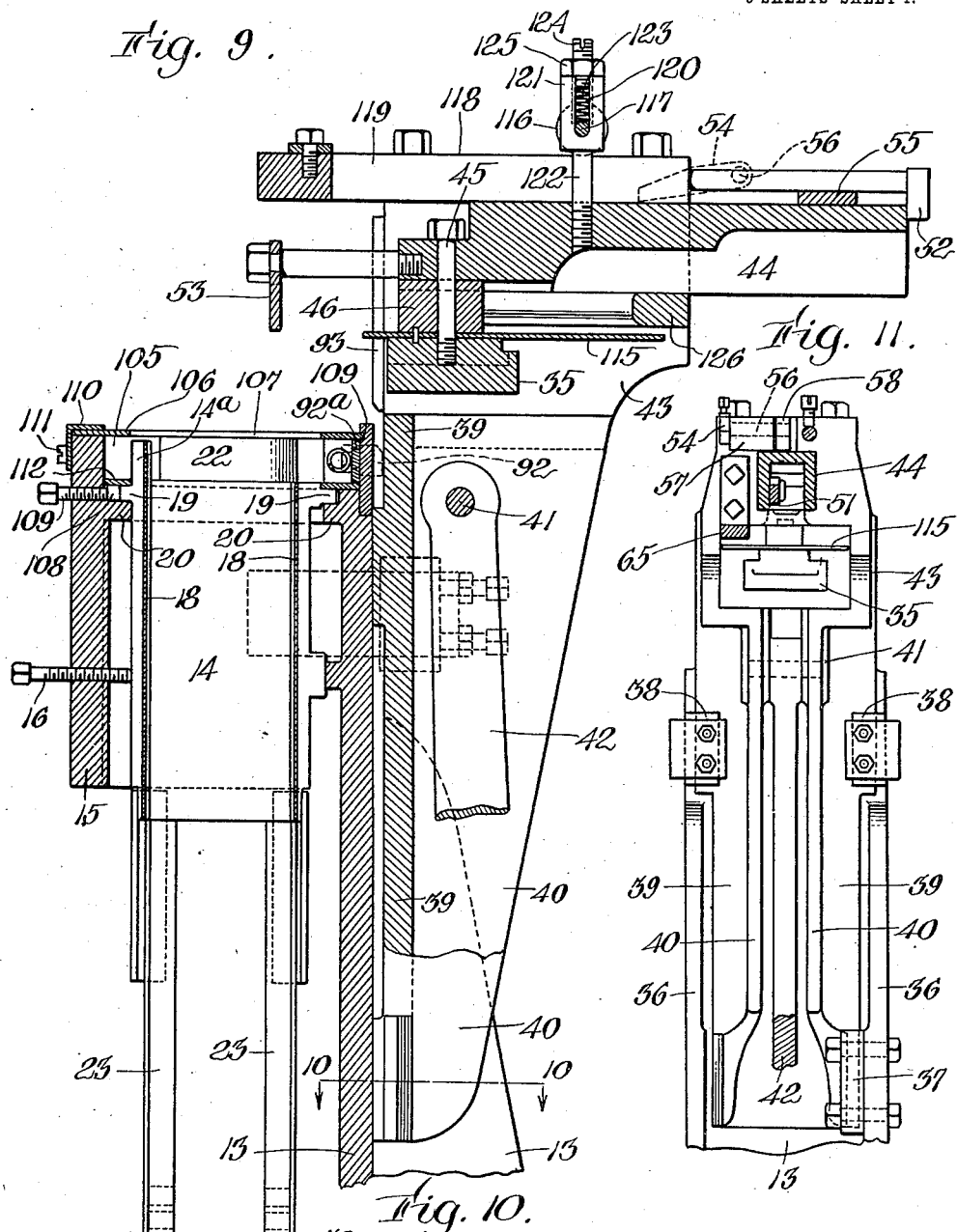
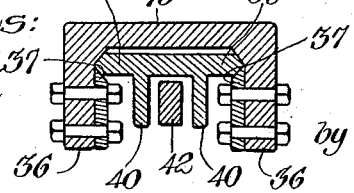

E. HANSALPAKAR.
MACHINE FOR MAKING HEEL LOGS.
APPLICATION FILED FEB. 25, 1913.
1,065,803.
Patented June 24, 1913.
5 SHEETS—SHEET 5.
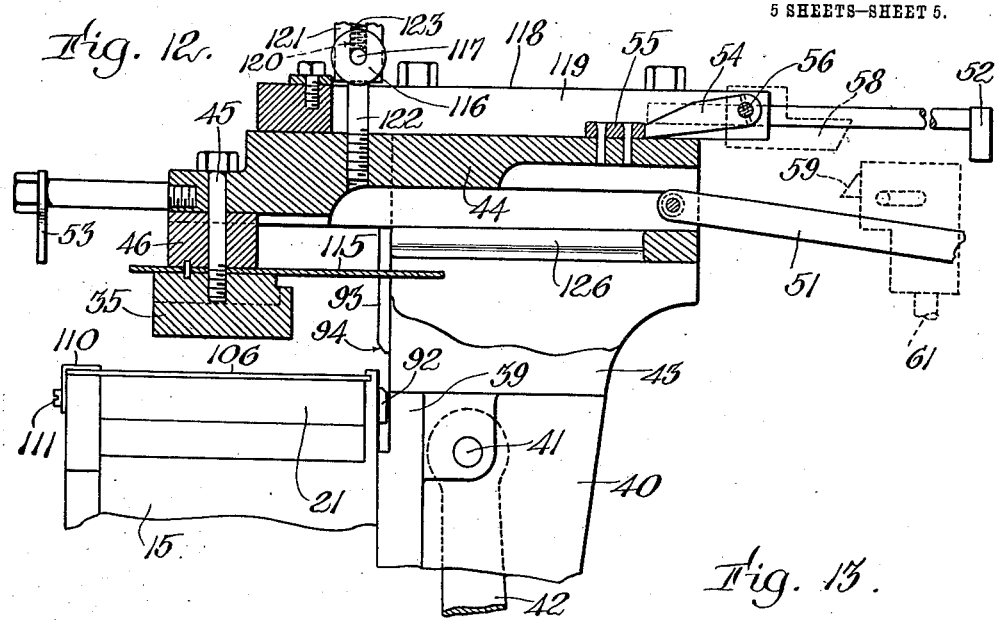
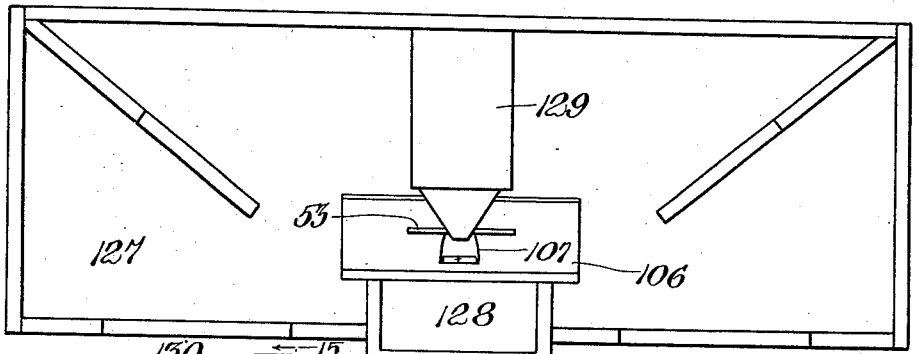
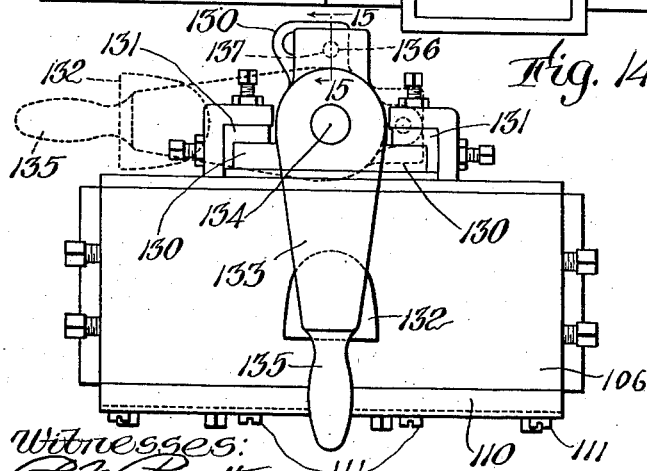
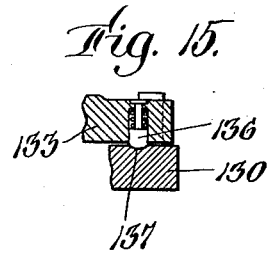

UNITED STATES PATENT OFFICE.

EDWIN HANSALPAKAR, OF RANDOLPH, MASSACHUSETTS, ASSIGNOR TO BROCKTON HEEL COMPANY, OF BROCKTON, MASSACHUSETTS, A CORPORATION OF MASSACHUSETTS.

MACHINE FOR MAKING HEEL-LOGS.

1,065,803.  Specification of Letters Patent.  Patented June 24, 1913.

Application filed February 25, 1913. Serial No. 750,522.

*To all whom it may concern:*

Be it known that I, EDWIN HANSALPAKAR, a citizen of the United States, and a resident of Randolph, in the county of Norfolk and State of Massachusetts, have invented certain new and useful Improvements in Machines for Making Heel-Logs, of which the following is a specification.

This invention relates to machines for making heel logs of the type shown by Letters Patent, No. 936,858, dated October 12, 1909, said machine including a mold into which paste-coated heel lifts are inserted intermittently and through which they are caused to move downwardly while being pressed against each other, an elongated vertical guide extending downwardly from the mold adapted to receive the accumulation of lifts forming a heel log, and means for pressing lifts into the mold, the lifts being inserted by the operator in the upper end of the mold and pressed downwardly into and through the mold, so that a heel log of indefinite length is built up, sections of the dried lower end of the log being removed from it, and being severed transversely into heel blanks.

The invention has for its object to provide an improved mechanism for assembling the lifts at the upper end of the mold and for forcing the lifts downwardly into and through the mold and guide, important results obtained by the mechanism embodying my invention being efficiency in the application of power to press the lifts together and force the log through the mold and guide, and safety to the operator, the organization of the machine being such that there is no liability of the operator's fingers being injured by the mechanism which presses the lifts into the mold.

The invention consists in the improvements which I will now proceed to describe and claim.

Figure 1:
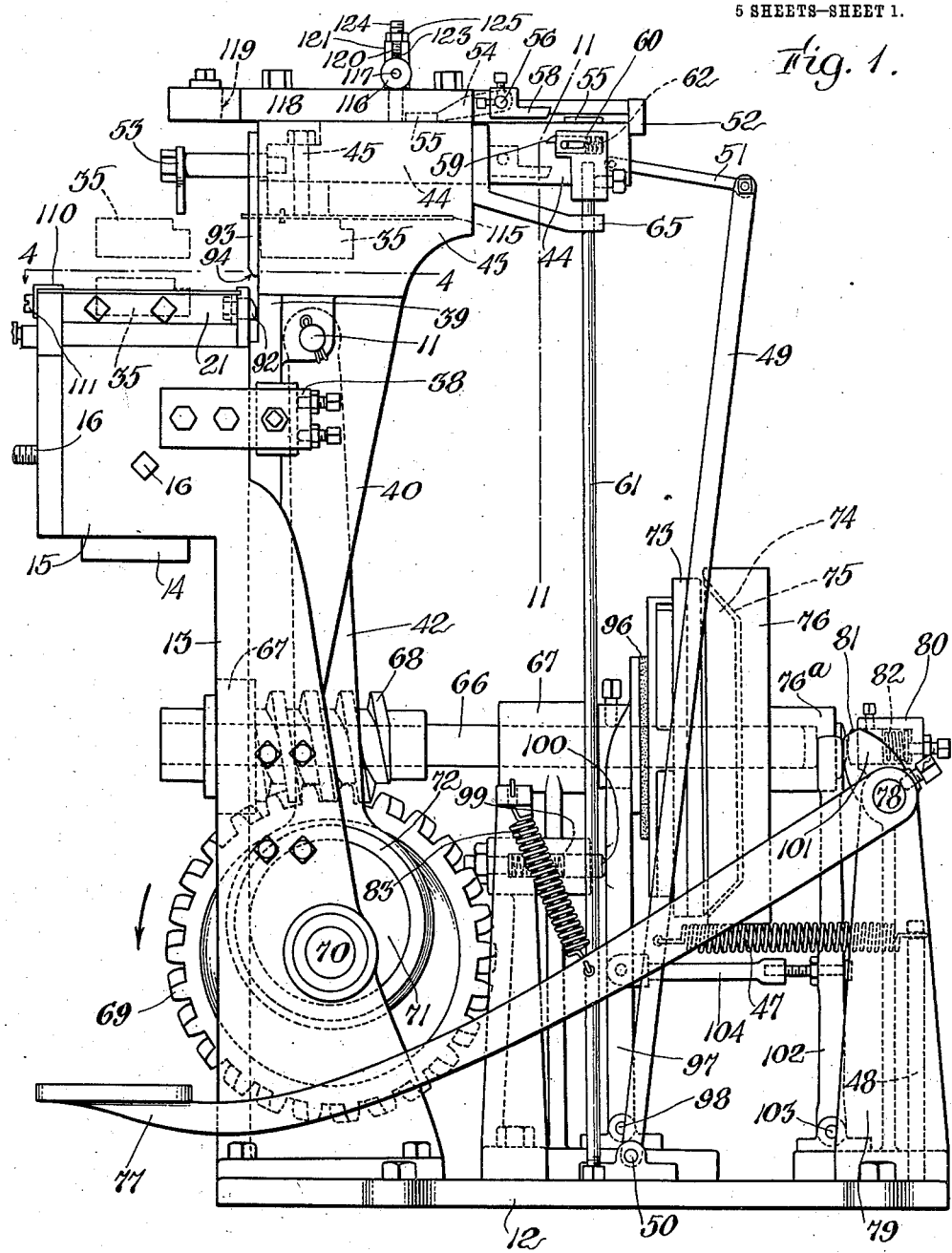
Figure 2:
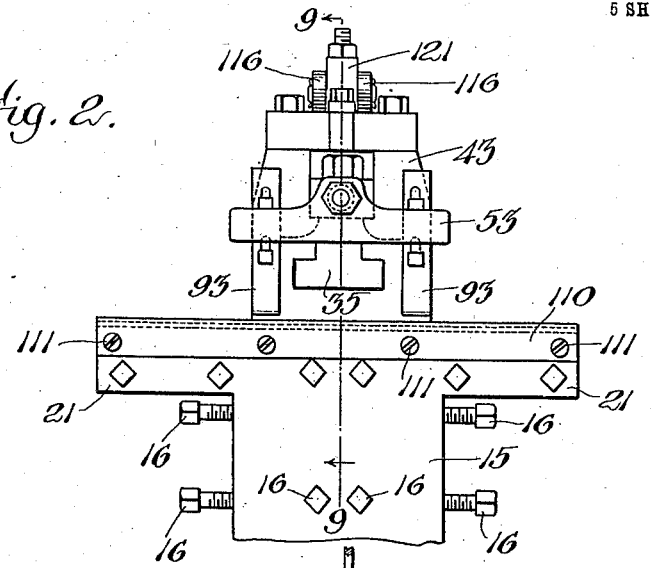
Figure 3:
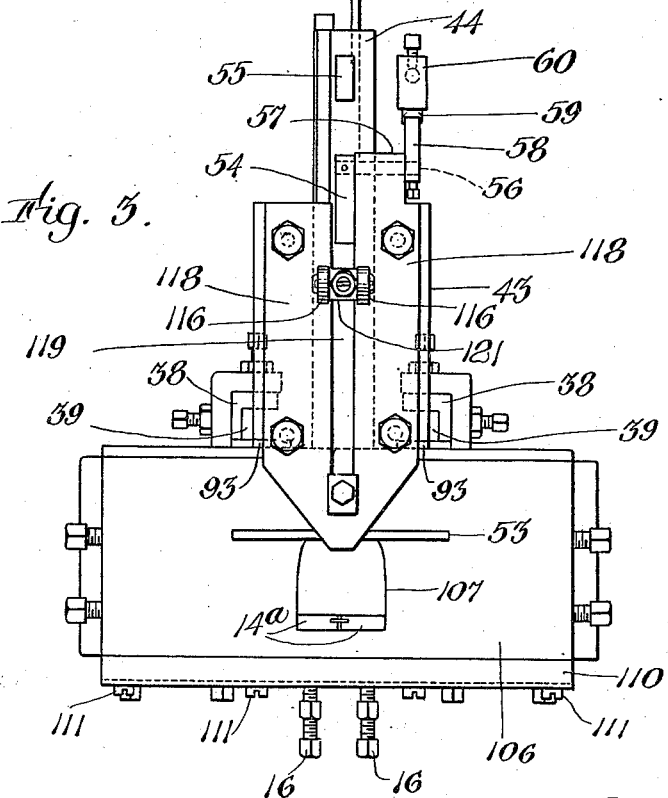

Of the accompanying drawings:—Figure 1 represents a side elevation of the portion of a heel log building machine in which my improvements are embodied. Fig. 2 represents a front elevation of a portion of the machine. Fig. 3 represents a top plan view of the same. Fig. 4 represents a section on line 4—4 of Fig. 1 and a plan view of parts below said line, the cover plate shown by Fig. 1 being removed and the lift-contracting jaws being shown in their open position. Fig. 5 represents a view similar to Fig. 4 showing the jaws in their closed position. Fig. 6 represents a section on line 6—6 of Fig. 4. Fig. 7 represents a top plan view showing the upper end of the mold and adjacent parts of the machine. Fig. 8 represents a perspective view showing the mold sections separated. Fig. 9 represents a section on line 9—9 of Fig. 2. Fig. 10 represents a section on line 10—10 of Fig. 9. Fig. 11 represents a section on line 11—11 of Fig. 1 and an elevation of the parts at the left of said line. Fig. 12 represents a view similar to a portion of Fig. 9 showing the plunger projecting over the mold. Fig. 13 represents a top plan view showing a lift receptacle or bin located above the machine. Fig. 14 represents a top plan view showing a modification. Fig. 15 represents a section on line 15—15 of Fig. 14.

The same reference characters indicate the same parts in all the figures.

In the drawings:—12 represents a fixed base to which is rigidly attached a vertical standard 13 which supports the heel mold 14, said standard having its upper portion formed as a casing 15 in which the heel mold is secured by set screws 16. The mold is preferably composed of two sections as shown by Fig. 8, which represents the sections separated from each other, each section having grooves 17 which when the sections are assembled as shown by Fig. 7, receive strips 18 which bridge the crevices between the sections and prevent paste on the heel lifts pressed into the mold from oozing out. The mold sections are provided with external flanges 19 seated on internal flanges 20 on the casing 15. The said casing has horizontal extensions 21 (Fig. 2) which, with the body of the casing, form an elongated horizontal support for the lift-contracting jaws 22 (Figs. 4 and 5) hereinafter described. The mold 14 is adapted to confine and guide the series of cement coated heel lifts forming the upper end portion of an elongated heel log, the log being forced downwardly step-by-step from the mold between vertical guide bars 23 forming a continuation of the guide provided by the mold, and adapted to guide the heel log below the mold, said guide bars being yieldingly pressed against the portions of the heel log passing between them, and offering sufficient frictional resistance to the downward movement of the log to prevent the dried and solidified lower portion of the log from breaking away from the comparatively green upper portion by its own weight, without offering excesisve frictional resistance to the downward movement of the log.

The standard 13 is utilized as a guide for a vertically reciprocating carrier adapted to vertically reciprocate the plunger 35 which forces the heel lifts into the mold 14, said plunger moving vertically with the carrier and being horizontally movable relatively to the carrier, and adapted to be located over the mold as shown by Fig. 12, preparatory to forcing lifts into the mold, and to be retracted as shown by Fig. 9 to permit the convenient insertion of heel lifts in the mold. The standard 13 has flanges 36 provided with guides 37 (Fig. 10) for the lower portion of the carrier. Guides 38 (Figs. 1 and 11) for the upper portion of the carrier are bolted to the casing 15. The said carrier as here shown comprises an elongated vertical runner 39 formed to slidingly engage said guides, and provided with flanges 40, to the upper end portions of which is pivoted at 41 a connecting rod 42 which vertically reciprocates the carrier, and a hollow head 43 (see Fig. 11) formed on or attached to the upper end of the said runner 39.

The head 43 is provided internally with elongated guiding faces or guides which extend substantially at right angles with the path of the carrier, and to guide a slide 44 to which the plunger 35 is attached by bolts 45 passing through a spacing block 46, the slide being movable independently on said guides and engaged thereby with the carrier so that the slide is movable with the carrier. The slide 44 is normally held retracted as shown by Figs. 1 and 9, by a spring 47 (Fig. 1) attached at one end to a fixed post 48, a lever 49 pivoted at one end to a fixed support 50 and attached to the spring 47, and a link 51 connecting the other end of the lever 49 with the slide 44. A stop 52 on the carrier limits the retraction of the slide.

53 represents a forwardly projecting handle which is attached to the slide 44 and is manipulated by the operator to draw the slide forward until the plunger 35 is directly above the mold as shown by the upper dotted line representation of the plunger in Fig. 1, the plunger being subsequently caused to enter the mold by the downward movement of the carrier, as shown by the lower dotted line representation.

When the slide has been drawn forward, a weighted latch 54 engages a shoulder 55 on the slide and prevents the retraction of the slide during the downward movement of the carrier, and until the carrier has been raised sufficiently to cause the latch to be raised by a tripping device which carries the latch to release the slide and permit its retraction. The latch 54 is attached to a stud 56 (Figs. 1, 11 and 12) journaled in a bearing 57 (Fig. 11) attached to the slide 44, and provided with a rearwardly projecting finger 58.

59 is a dog or trip yieldingly mounted in a fixed block 60 supported by a fixed vertical rod 61 attached to the base 12. The trip 59 is yieldingly held by a spring 62 in the path in which the finger 58 moves vertically when the slide 44 is projected as shown by Fig. 12. The trip 59 and latch finger 58 are beveled so that when the carrier is moved downwardly from the position shown by Fig. 12, the finger rides over the trip and displaces the latter. On the upward movement of the carrier the trip 59 opposes the upward movement of the finger 58 and causes the latter to yield and raise the latch 54 from engagement with the shoulder 55 so that the slide 44 and plunger 35 are free to be retracted by the spring 47. The rod 61 is steadied by an arm 65 attached to the carrier, said arm having an orifice through which the rod passes.

66 represents a driving shaft journaled in bearings 67 supported by the base 12. To said shaft is affixed a worm 68 engaging a worm wheel 69 on a transverse shaft 70 which is journaled in bearings upon the standard 13. To the shaft 70 is affixed an eccentric 71 embraced by a strap 72 formed on the lower end of the connecting rod 42. The rotation of the shaft 66 communicated to the shaft 70 by the described gearing, causes the eccentric to raise and depress the carrier, the slide 44 and the plunger 35.

To the driving shaft 66 is affixed a pulley 73 having a frictional clutch member 74 adapted to engage a complemental clutch member 75 on a driving pulley 76 which is loosely mounted on the shaft 66. The pulley 76 is moved into and out of engagement with the pulley 73 by mechanism which includes a treadle lever 77 affixed to a rock shaft 78 which is journaled in bearings in the standard 79 on the base 12, an arm 80 affixed to said rock shaft and provided with a presser 81 which is yieldingly backed by a spring 82, and bears on the hub 76ᵃ of the pulley 76. A spring 83 normally raises the lever 77 and holds the presser 81 retracted so that the pulley 76 is normally disengaged from the pulley 73. When the lever 77 is depressed by the operator's foot, the arm 80 is swung inwardly and the presser 81 caused to yieldingly press the pulley 76 into engagement with the pulley 73 so that rotation is imparted from the pulley 76, (on which a driving belt runs) to the pulley 73 and shaft 66.

The above mentioned lift-contracting jaws 22 are located just above the upper end of the mold and are attached to slides 85 which are movable on the elongated horizontal support at the upper end of the casing 15. The slides 85 have oblique edges 86 which are opposed to oblique edges 87 of fixed guide pieces 88. Between the faces 86 and 87 are interposed loose antifrictional rolls 89 which are held apart by loose spacing blocks 90. The slides 85 and jaws 22 are normally held separated from each other by a spring 91 as shown by Fig. 4. The slides 85 are movable in the direction indicated by the arrows $x$, Fig. 4, by means presently described, to close the jaws 22 as indicated by Fig. 5. Each slide bears loosely on a presser bar 92$^a$ provided with rearwardly projecting studs 92, these studs projecting through orifices in the rear wall of the case or chamber provided for the reception of the jaws, slides and blocks, and being normally held by the action of the spring 91 in the paths of vertical wedge-members 93 affixed to the carrier head 43, the lower edge of said members having beveled faces 94, Fig. 1. When the carrier descends, the members 93 engage the studs 92 and force the presser bar and the slides 85 in the direction indicated by the arrows $x$, the slides being at the same time forced toward each other to close the jaws by the means above described.

The operation of the machine is as follows: The carrier being raised and the slide 44 and plunger 35 retracted as shown by Fig. 9, and the jaws 22 being at the same time separated as shown by Fig. 4, the operator places one or more heel lifts in the space between the jaws 22, the lifts being coated with paste and being made up of single pieces, or of a plurality of sections 95, as shown by Figs. 4 and 5. The operator next grasps the handle 53 and draws the slide 44 and plunger 35 forward to the position shown by Fig. 12, the slide being automatically locked in this position by the latch 54. The plunger is now directly over the mold. The operator then depresses the treadle 77 and thus causes the power mechanism above described to depress the carrier, slide and plunger. Before the plunger comes to a bearing on the lift between the jaws 22, said jaws are closed as shown by Fig. 5, the lift being thus contracted by pressure against its margin and held in exact alinement with the plunger 35 so that the continued descent of the plunger causes it to bear on the lift and press it from between the jaws 22 into the mold 14. During the downward movement of the carrier and plunger the latch finger passes inoperatively by the trip 59. During the succeeding upward movement of the carrier and plunger the trip 59 acts as above described to raise the latch 54, thus releasing the slide which is automatically retracted to the position shown by Fig. 9, the jaws being thus exposed so that the operator can conveniently place another lift or lifts between them.

To quickly stop the rotation of the driving shaft when the treadle lever is released, I provide a brake composed of a shoe 96 attached to a lever 97 which is pivoted at 98, and is normally pressed toward the pulley 73, to apply the shoe 96 thereto, by a spring 99 and a stud 100 backed by the spring and bearing against the lever 97. The depression of the treadle lever separates the shoe 96 from the pulley 73 through a cam 101 affixed to the rock shaft 78, a lever 102 pivoted at 103 and bearing on the cam 101, and a link 104 connecting the levers 97 and 102.

The lift-contracting jaws 22 and the upper end of the mold are inclosed in a shallow chamber 105 (Fig. 9) adapted to prevent the scattering of the paste which is caused to exude from the heel lifts by the pressure of the jaws and of the plunger against the lifts. The top of the chamber is formed by a thin covering plate 106 detachably secured by the insertion of its rear edge into a groove 109 (Fig. 9) in the rear wall of the chamber, and by a flanged strip 110 secured by screws 111 to the front wall. The bottom of the chamber is formed by a thin plate 112 (Figs. 7 and 9) bearing on the flange 20 of the casing 15, and on the flanges 19 of the mold sections. The bottom plate 112 has a rectangular opening 113 (Fig. 7) which receives the upper end of the mold 14 and the top plate 106 has a heel shaped opening 107 (Fig. 3) formed to permit the insertion of heel lifts between the jaws 22.

115 represents a thin baffle plate attached to the plunger and adapted to prevent paste from squirting upwardly against the slide 44. The sections of the mold 14 have upwardly projecting ears 14$^a$ which project through the opening in the bottom plate 112, and support the breast ends of the heel lifts inserted between the jaws 22. Clamps 108 (Fig. 4) backed by set screws 109, bear on the flanges 19 at the front side of the mold. To permit the horizontal movements of the plunger-carrying slide 44 with the minimum of frictional resistance, I provide a pair of antifriction rolls 116 (Figs. 2, 3 and 9) mounted on an axle 117 and adapted to roll on upper guides 118 bolted to the top of the carrier head 43, said guides being separated by a slot 119. The axle 117 passes through a vertical slot 120 in a head 121 formed on a shank 122 affixed to the slide 44 and passing through the slot 119. A spring 123 located in a chamber in the head and interposed between the axle 117 and an abutment at the upper portion of the head, (said abutment being preferably formed by a screw 124 engaged with a tapped orifice in the head and secured by a lock nut 125,) exerts an upward pressure on the slide through the head and shank, and thus partially counterbalances the weight of the slide and plunger and minimizes the friction of the slide on the lower guides 126 (Figs. 9 and 12) on which it rests.

The shaft 70 and its eccentric 71 are centrally located under the longitudinal center of the carrier and advantageously exert power thereon to reciprocate the carrier. The connecting rod is pivoted to the carrier between the front and rear sides thereof. Said shaft, the eccentric, the strap 72, and the connecting rod 42, all relatively arranged as shown by Fig. 1, constitute a simple and effective power applying mechanism having few parts, and free from liability to wear causing lost motion of the carrier and plunger.

Fig. 13 shows a shelf or bin 127 adapted to hold heel lifts or lift sections and provided with a paste box 128, the shelf being suitably attached to the fixed casing 15, and having a casing 129 which covers and is formed to permit the vertical movements of the carrier head 43.

Figs. 14 and 15 show a modification in which the carrier is a simple slide 130 engaged with fixed vertical guides 131 on a standard corresponding to the standard 13, the carrier head 43 and slide 44 being omitted. The plunger 132 is attached to a horizontal arm 133 which is pivoted at 134 to the carrier, and is provided with a handle 135. The arm 133 is adapted to be manually moved by the operator to the position shown by full lines, Fig. 14, thus locating the plunger in an operative position over the mold, the arm being confined in said position by a spring bolt 136, Fig. 15, which springs into a recess 137 in the carrier. When the arm is swung toward the dotted line position (Fig. 14) to retract the plunger, the bolt yields and leaves the recess.

In each embodiment of the invention the operator is obliged to manually project or move the plunger to its operative position, so that there is practically no liability of injury to the operator's fingers by the descending plunger, the fingers being necessarily removed from the path of the plunger after the insertion of a lift between the jaws, for the purpose of moving the plunger to its operative position.

What I claim and desire to secure by Letters Patent is:—

1. A machine of the character stated comprising a mold, a reciprocating carrier movable beside the mold and provided with elongated guides extending substantially at right angles with the path of the carrier, mechanism for reciprocating the carrier, a slide movable independently on said guides and engaged thereby with the carrier to move in unison with the carrier, a plunger attached to the slide, the slide and plunger being manually movable to an operative position locating the plunger over the mold and adapted to be retracted from said position, and means for confining the slide and plunger in said operative position.

2. A machine of the character stated comprising a mold, a reciprocating carrier movable beside the mold and provided with elongated guides extending substantially at right angles with the path of the carrier, mechanism for reciprocating the carrier, a slide movable independently on said guides and engaged thereby with the carrier to move in unison with the carrier, a plunger attached to the slide, the slide and plunger being manually movable to an operative position locating the plunger over the mold and adapted to be retracted from said position, means for confining the slide and plunger in said operative position, means for automatically releasing the slide and plunger after the operation of the plunger, and means for automatically retracting the slide and plunger.

3. A machine of the character stated comprising a mold, a reciprocating carrier movable beside the mold, mechanism for reciprocating the carrier, a slide on the carrier, a plunger attached to the slide, the slide and plunger being manually movable to an operative position locating the plunger over the mold, a latch on the carrier adapted to automatically lock the slide in said operative position, a latch tripper operated by a movement of the carrier to automatically displace the latch and release the carrier, and means for automatically retracting the slide and plunger from said operative position.

4. A machine of the character stated comprising a mold, a reciprocating carrier movable vertically beside the mold and having horizontal upper and lower guides, mechanism for reciprocating the carrier, a slide movable horizontally between said guides, a plunger attached to the slide, the slide and plunger being manually movable independently of the carrier, and antifrictional means coöperating with the said upper guides for pressing the slide upwardly and minimizing frictional resistance to the movement of the slide on the lower guides.

5. A machine of the character stated comprising a mold, a reciprocating carrier movable vertically beside the mold and having horizontal upper and lower guides, mechanism for reciprocating the carrier, a slide movable horizontally between said guides, a plunger attached to the slide, the slide and plunger being manually movable independently of the carrier, a shank attached to the slide and projecting between the upper guides said shank having a chambered slotted head, antifriction rolls bearing on the upper guides, and mounted on an axle passing through the slotted head, and a spring interposed between said axle and an abutment on the head and exerting a yielding upward pressure on the slide.

6. A machine of the character stated, comprising a mold, a reciprocating carrier movable beside the mold, mechanism for reciprocating the carrier, a plunger on the carrier, lift-contracting jaws located above the mold, and mechanism operated by a downward movement of the carrier for closing said jaws on a lift inserted between them.

7. A machine of the character stated comprising a mold, a reciprocating carrier movable beside the mold and provided with members of a jaw-closing mechanism, mechanism for reciprocating the carrier, a plunger on the carrier, lift-contracting jaws located above the mold, and complemental members of said jaw-closing mechanism coöperating with the members on the carrier to close the jaws on a heel lift inserted between them, means being provided for normally opening the jaws.

8. A machine of the character stated comprising a mold, a reciprocating carrier movable beside the mold and provided with wedge members, mechanism for reciprocating the carrier, a plunger on the carrier, lift-contracting jaws located above the mold, slides attached to said jaws and having oblique edges, fixed guides having oblique edges opposed to the oblique edges of said slides, antifriction rolls interposed between the oblique edges of said slides and guides, and a presser bar bearing on the rear edge of said slides and having studs coöperating with said wedge members to exert closing pressure on the jaws, means being provided for automatically opening the jaws.

9. A machine of the character stated, comprising a mold, a reciprocating carrier movable beside the mold, mechanism for reciprocating the carrier, a plunger on the carrier, lift-contracting jaws located above the mold, mechanism operated by a downward movement of the carrier for closing said jaws on a lift inserted between them, and a chamber inclosing the jaws adapted to prevent the scattering of paste, said chamber having top and bottom openings for the reception of the plunger and mold.

10. A machine of the character stated, comprising a mold, a reciprocating carrier movable beside the mold, mechanism for reciprocating the carrier, a plunger on the carrier, lift-contracting jaws located above the mold, mechanism operated by a downward movement of the carrier for closing said jaws on a lift inserted between them, and a chamber inclosing the jaws adapted to prevent the scattering of paste, said chamber having top and bottom openings for the reception of the plunger and mold, and the plunger being provided with a baffle plate above the said top opening.

11. A machine of the character stated comprising a supporting standard, a mold supported by said standard, a vertical carrier adapted to reciprocate vertically on said standard beside the mold, and provided with elongated guides extending substantially at right angles with the path of the carrier, a plunger, means for slidably connecting the plunger with said guides, carrier-reciprocating mechanism including a power driven shaft journaled in fixed bearings under the longitudinal center of the carrier, and provided with an eccentric, and a connecting rod engaged with said eccentric and pivoted to the carrier at a point above the shaft, and between the front and rear sides of the carrier.

12. A machine of the character stated comprising a supporting standard, a mold supported by said standard, a carrier adapted to reciprocate on said standard beside the mold, a plunger supported by said carrier, carrier reciprocating mechanism including a shaft journaled in fixed bearings below the carrier, and provided with a worm gear and with an eccentric, and a connecting rod engaged with said eccentric and pivoted to the carrier at a point above the shaft, a driving shaft having a worm engaging said worm gear, a pulley fast on the driving shaft and having a clutch member, a driving pulley loose on the driving shaft and having a complemental clutch member normally disconnected from the first mentioned clutch member, and means including a treadle lever for connecting said clutch members.

13. A machine of the character stated comprising a supporting standard, a mold supported by said standard, a carrier adapted to reciprocate on said standard beside the mold, a plunger supported by said carrier, carrier reciprocating mechanism including a shaft journaled in fixed bearings below the carrier, and provided with a worm gear and with an eccentric, and a connecting rod engaged with said eccentric and pivoted to the carrier at a point above the shaft, a driving shaft having a worm engaging said worm gear, a pulley fast on the driving shaft and having a clutch member, a driving pulley loose on the driving shaft and having a complemental clutch member, means including a treadle lever for connecting such clutch members, a brake normally applied to the fast pulley, and connections between the brake and the treadle lever for removing the brake from the fast pulley when the clutch members are connected.

In testimony whereof I have affixed my signature, in presence of two witnesses.

EDWIN HANSALPAKAR.

Witnesses:
W. P. BOSWORTH,
F. W. CRANE.

Copies of this patent may be obtained for five cents each, by addressing the "Commissioner of Patents, Washington, D. C."